(12) United States Patent
Schwarz et al.

(10) Patent No.: US 9,130,931 B2
(45) Date of Patent: *Sep. 8, 2015

(54) METHOD FOR READING AN ATTRIBUTE FROM AN ID TOKEN

(71) Applicant: BUNDESDRUCKEREI GMBH, Berlin (DE)

(72) Inventors: Carsten Schwarz, Berlin (DE); Günter Koch, Berlin (DE)

(73) Assignee: BUNDESDRUCKEREI GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,633

(22) Filed: Aug. 6, 2014

(65) Prior Publication Data

US 2015/0026476 A1     Jan. 22, 2015

Related U.S. Application Data

(63) Continuation of application No. 13/637,691, filed as application No. PCT/EP2011/056315 on Apr. 20, 2011, now Pat. No. 8,812,851.

(30) Foreign Application Priority Data

Apr. 22, 2010   (DE) .................. 10 2010 028 133

(51) Int. Cl.
*H04L 9/32*       (2006.01)
*H04L 29/06*      (2006.01)
*G06F 21/33*      (2013.01)
*G06F 21/34*      (2013.01)
*G06F 21/41*      (2013.01)

(52) U.S. Cl.
CPC .......... *H04L 63/0823* (2013.01); *G06F 21/33* (2013.01); *G06F 21/34* (2013.01); *G06F 21/41* (2013.01); *H04L 63/0428* (2013.01); *H04L 63/102* (2013.01); *H04L 63/1466* (2013.01)

(58) Field of Classification Search
CPC .......... H04L 9/32; H04L 9/3234; G06F 21/30
USPC ................ 713/175–185; 726/2, 9, 18; 705/59
See application file for complete search history.

(56) References Cited

U.S. PATENT DOCUMENTS

| 6,438,550 | B1 * | 8/2002 | Doyle et al. ...................... 726/2 |
| 8,370,638 | B2 * | 2/2013 | Duane et al. ................. 713/185 |
| 8,474,028 | B2 * | 6/2013 | Kulkarni et al. .................. 726/9 |
| 2004/0162786 | A1 * | 8/2004 | Cross et al. ..................... 705/59 |
| 2006/0137015 | A1 * | 6/2006 | Fahrny et al. ................... 726/26 |
| 2007/0294431 | A1 * | 12/2007 | Adelman et al. ............. 709/245 |
| 2011/0023103 | A1  | 1/2011 | Dietrich et al. |
| 2011/0296512 | A1 * | 12/2011 | Dietrich et al. ................... 726/9 |
| 2012/0304245 | A1 * | 11/2012 | Lawson et al. ................... 726/1 |

FOREIGN PATENT DOCUMENTS

| DE | 10 2008 000 067 | 7/2009 |
| DE | 10 2008 040 416 | 1/2010 |
| DE | 10 2008 042 262 | 4/2010 |
| DE | 10 2009 026 953 | 12/2010 |
| DE | 10 2009 027 681 | 1/2011 |
| DE | 10 2009 027 723 | 1/2011 |

OTHER PUBLICATIONS

Jensen M, On Technical Security Issues in Cloud Computing, Sep. 2009, IEEE, pp. 21-25.*
Chappell, D., "Introducing Windows CardSpace", www.msdn.microsoft.com, Apr. 1, 2006.
"OpenID Authentication 2.0—Final", www.specs@openid.net, Dec. 5, 2007.

* cited by examiner

*Primary Examiner* — Dede Zecher
*Assistant Examiner* — Viral Lakhia
(74) *Attorney, Agent, or Firm* — Leveque IP Law, P.C.

(57) ABSTRACT

A method for reading at least one attribute stored in an ID token using first, second and third computer systems, wherein the third computer system comprises a browser and a client, and wherein a service certificate is assigned to the second computer system, wherein the service certificate comprises an identifier which is used to identify the second computer system, wherein the ID token is assigned to a user, a first cryptographically protected connection (TLS1) is set up between the browser of the third computer system and the second computer system, wherein the third computer system receives a first certificate, the first certificate is stored by the third computer system, the third computer system receives a signed attribute specification via the first connection, a second cryptographically protected connection (TLS2) is set up between the browser of the third computer system and the first computer system, wherein the third computer system receives a second certificate, the signed attribute specification is forwarded from the third computer system to the first computer system via the second connection, the first computer system accesses an authorization certificate, wherein the authorization certificate comprises the identifier, a third cryptographically protected connection (TLS3) is set up between the first computer system and the client of the third computer system, wherein the third computer system receives the authorization certificate containing the identifier via the third connection, the client of the third computer system checks whether the first certificate comprises the identifier as proof of the fact that the first certificate matches the service certificate, the user is authenticated with respect to the ID token, the first computer system is authenticated with respect to the ID token, a fourth cryptographically protected connection with end-to-end encryption is set up between the ID token and the first computer system, after the user and the first computer system have been successfully authenticated with respect to the ID token, the first computer system has read access to the at least one attribute stored in the ID token via the fourth connection in order to read the one or more attributes specified in the attribute specification from the ID token,—the first computer system transmits the at least one attribute to the second computer system after said attribute has been signed.

18 Claims, 4 Drawing Sheets

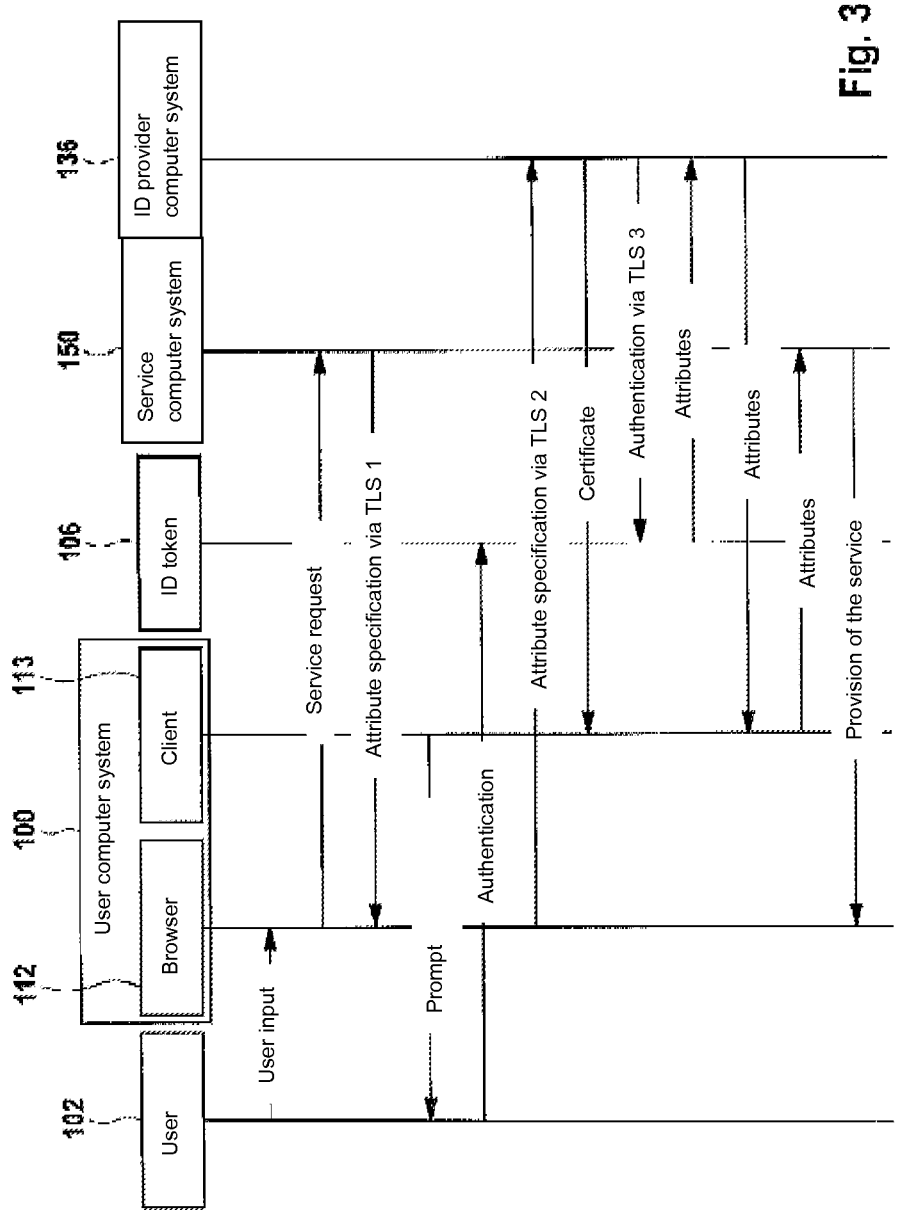

_US 9,130,931 B2_

METHOD FOR READING AN ATTRIBUTE FROM AN ID TOKEN

PRIORITY CLAIM

This application is a continuation of U.S. patent application Ser. No. 13/637,691 filed on Feb. 12, 2013, now U.S. Pat. No. 8,812,851 issued on Aug. 19, 2014 which is a 371 application of PCT/EP2011/056315 with an international filing date of Apr. 20, 2011, which claims benefit of foreign priority in accordance with 35 U.S.C. 119(b) to German application No. 10 2010 028 133.6 filed Apr. 22, 2010. These prior applications, including the entire written description and drawing figures, are hereby incorporated into the present application by reference.

BACKGROUND

Various methods for managing what is known as a user's digital identity are known from the prior art.

Microsoft Windows CardSpace is a client-based digital identity system that is intended to allow Internet users to provide their digital identity to online services. One of the drawbacks here is that the user can manipulate the digital identity.

OpenID, in contrast, is a server-based system. An identity server stores a database containing the digital identities of the registered users. One of the drawbacks here is inadequate data protection, because the digital identities of the users are stored centrally and the user behavior can be recorded.

US 2007/0294431 A1 discloses another method for managing the digital identities that also requires a user registration.

A method for reading at least one attribute from an ID token is known from DE 10 2008 000 067 A1, which is considered to be the prior art closest to the present invention. Refinements of this method are disclosed in the patent applications DE 10 2008 040 416, DE 10 2008 042 262, DE 10 2009 026 953, DE 10 2009 027 723, and DE10 2009 027 681.

BRIEF DESCRIPTION OF THE DRAWINGS

In the following, embodiments of the invention are further explained with reference to the drawings. The figures show:

FIG. 3 shows UML chart of a further embodiment of a method according to the invention.

DESCRIPTION

Figure 1A:
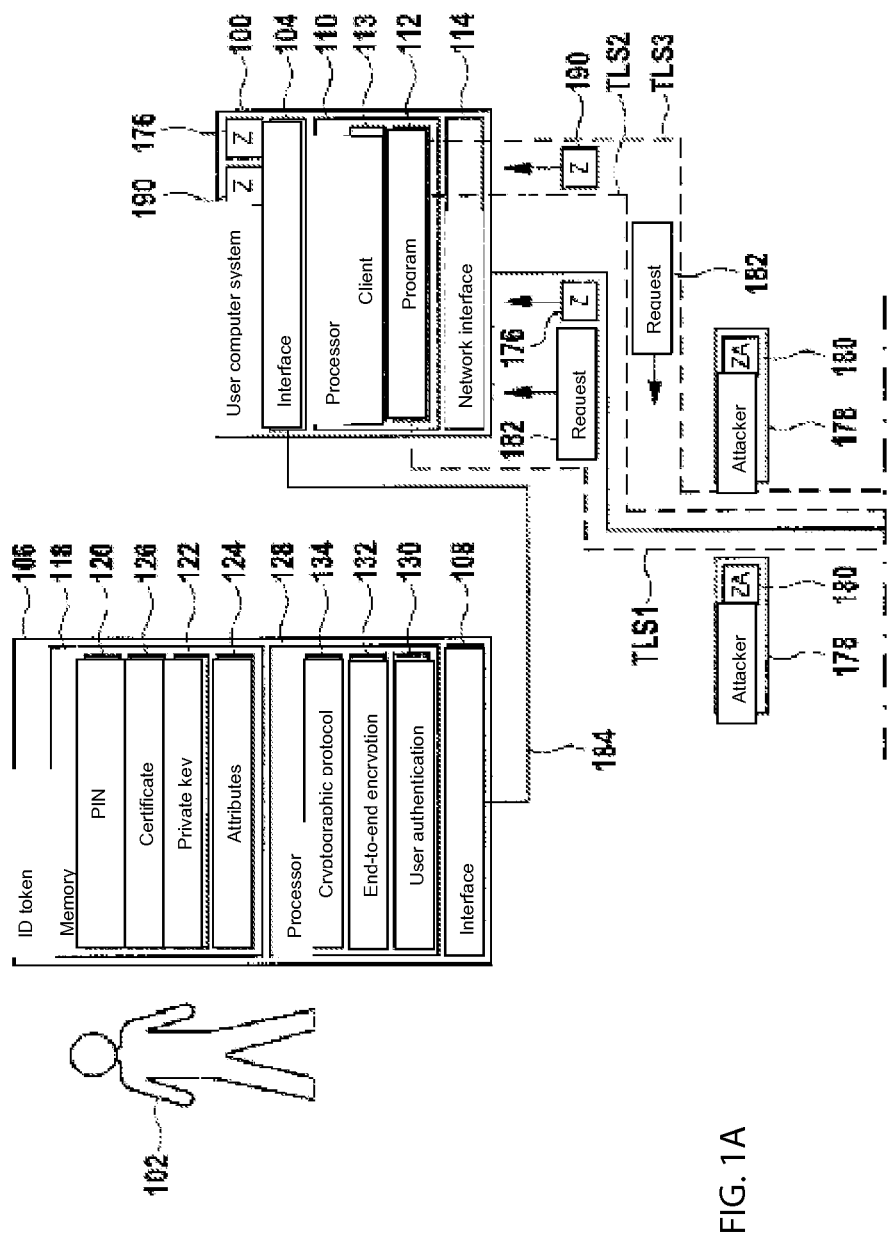
FIGS. 1A and 1B show a block diagram of a first embodiment of computer systems according to the invention.

In contrast, it is the object of the invention to create an improved method for reading at least one attribute and a corresponding computer program product and a computer system.

The objects of the invention are achieved by the characteristics of the independent claims. Embodiments of the invention are described in the dependent claims.

The invention relates to a method for reading at least one attribute from an ID token, to a computer program product, and to a computer system.

According to embodiments of the invention, a method for reading at least one attribute which is stored in an ID token is created, the ID token being assigned to a user. The method comprises the following steps: authenticating the user with respect to the ID token; authenticating a first computer system with respect to the ID token; after the user and the first computer system have been successfully authenticated with respect to the ID token, providing the first computer system with read access to the at least one attribute stored in the ID token for transmitting the at least one attribute to a second computer system. As a result, a "trust anchor" can be created.

Embodiments of the invention allow one or more of the attributes stored in an ID token to be read by the first computer system, wherein the connection between the ID token and the first computer system can be established via a network, and more particularly the Internet. The at least one attribute can be information regarding the identity of the user asigned to the ID token, notably the so-called digital identity of the same. For example, the first computer system reads the attributes last name, first name and address so as to forward these attributes to a second computer system, for example of an online service.

However, it is also possible to read only a single attribute, for example, which is not used to establish the identity of the user, but for example to check the user's qualification to utilize a certain online service, for example the age of the user, if the user wants to utilize an online service that is reserved to a specific age group, or another attribute that documents that the user belongs to a specific group which is authorized to use the online service.

The ID token can be a portable electronic device, such as a USB stick, for example, or a document, notably a value or security document.

So as to defend against a so-called "man-in-the-middle attack", the following procedure is employed:

To begin with, a first cryptographically protected connection is established between a browser of a third computer system and the second computer system, wherein the third computer system receives a first certificate via the first connection. For example, receipt of the first certificate is required for establishing the first cryptographically protected connection. The first certificate can also be received by the third computer system via the first cryptographically protected connection as part of the signature of the signed attribute specification. The first certificate contains an identifier of the second computer system.

The first certificate received via the first cryptographically protected connection is stored by the third computer system at least temporarily for a predetermined time period. In addition, a second cryptographically protected connection is established between the browser of the third computer system and the first computer system, and the signed attribute specification is forwarded via the second connection from the browser to the first computer system, for example via a so-called redirect.

The first computer system is authorized by the operator of the second computer system, which offers a service, to carry out the ID provider function. For this purpose, an authorization certificate asigned to the second computer system, and optionally the authorization certificates of further second computer systems, which can likewise utilize the ID provider function of the first computer system, are stored in the first computer, as are the respective associated private keys. The authorization certificate assigned to the second computer system contains the identifier thereof.

Based on the signature of the attribute specification, the first computer identifies the authorization certificate of the second computer system that signed the attribute specification. A third cryptographically protected connection is established between the first computer system and the client of the third computer system, wherein the client of the third computer system receives the authorization certificate from the first computer system via the third connection. The third computer system then checks through the client thereof whether the identifiers match. The certificate of the first computer system can be used to establish the third cryptographically protected connection so as to then transmit the authorization certificate of the identified second computer system via this third connection, or the authorization certificate of the second computer system can be used to establish the third connection, so that the authorization certificate is transmitted via this connection.

If this is the case, this is proof of the fact that the first certificate with the service certificate, which is to the second computer system and which was used to sign the attribute specification, and the authorization certificate are to each other. If such an association does not exist, this indicates a man-in-the-middle attack, resulting in termination.

In contrast, if the first certificate and the authorization certificate are to each other via the respective indicators, the first computer system authenticates itself with respect to the ID token, and a fourth cryptographically protected connection with end-to-end encryption is established between the ID token and the first computer system. If the user has also successfully authenticated himself with respect to the ID token, the read access of the first computer system can take place via the fourth connection.

According to the invention, a "document" shall be understood to mean paper-based and/or plastic-based documents, for example identification documents, in particular passports, identification cards, visas as well as driver's licenses, vehicle registrations, vehicle titles, company ID cards, health insurance cards or other identification documents, and also chip cards, payment instruments, in particular bank notes, bank cards and credit cards, bills of lading or other proofs of authorization, in which a data memory for storing the at least one attribute is integrated.

A "certificate" in the present invention shall be understood to mean a digital certificate, which is also referred to as a public key certificate. A certificate encompasses structured data which is used to associate a public key of an asymmetric cryptosystem with an identity, for example a person or a device. The certificate can, for example, correspond to the X.509 standard or another standard. It can notably be an SSL certificate or a TLS certificate.

An "authorization certificate" in the present invention shall be understood to mean a certificate that contains a specification of access rights to attributes stored in the ID token. An authorization certificate may contain a reference to one or more certificates, in particular SSL or TLS certificates, which are asigned to the authorization certificate.

Embodiments of the invention are therefore particularly advantageous because the at least one attribute is read from a particularly trustworthy document, for example an official document. It is further particularly advantageous that no central storage of the attributes is required. The invention thus allows a particularly high degree of trustworthiness regarding the communication of the attributes that belong to a digital identity, combined with optimal data protection and extremely convenient handling.

According to one embodiment of the invention, the first computer system has at least one authorization certificate, which is used to authenticate the first computer system with respect to the ID token. The authorization certificate contains information about those attributes for which the first computer system has a read authorization. Based on this certificate, the ID token checks whether the first computer system has the necessary read authorization for the read access to the attribute, before such a read access can be carried out by the first computer system. This authorization certificate is asigned to a service certificate of the second computer system, which is to say it contains the same identifier as the service certificate. If no man-in-the-middle attack exists, the first certificate, which the third computer receives when the first connection is established, is the service certificate of the second computer system.

According to one embodiment of the invention, the first computer system directly transmits the at least one attribute read out by the ID token to the second computer system. The second computer system can, for example, be a server for providing an online service or another service, such as a bank service or for ordering a product. For example, the user can open an account online, for which purpose attributes containing the user's identity can be transmitted from the first computer system to the second computer system of a bank.

According to one embodiment of the invention, the attributes read from the ID token are first transmitted from the first computer system to a third computer system of the user. The third computer system has a conventional browser, for example, via which the user can open a website of the second computer system. The user can enter a request or order for a service or product in the website.

The second computer system then specifies those attributes, of the user or his ID token for example, which the system requires to provide the service or accept the order. The corresponding attribute specification that contains the specification of these attributes is then transmitted from the second computer system via the third computer system to the first computer system.

According to one embodiment of the invention, the user's service request to the second computer system includes an identifier, the identifier identifying the first computer system. The identifier can be a link, for example a URL of the first computer system.

According to one embodiment of the invention, the attributes read from the ID token are signed by the first computer system and then transmitted to the third computer system. The user of the third computer system can thus read the attributes, without being able to modify then. The attributes are forwarded from the third computer system to the second computer system not until the release has been given by the user.

According to one embodiment of the invention, the user can supplement the attributes by additional data before forwarding them.

According to one embodiment of the invention, the first computer system comprises several authorization certificates having differing read rights. Upon receipt of the attribute specification, the first computer system selects one or more of these authorization certificates so as to read the corresponding attributes from the ID token.

According to one embodiment of the invention, the first, second and third connections are transport layer connections, respectively, which are cryptographically protected. The first, second and third connections are, for example, respective Transport Layer Security (TLS) or Secure Sockets Layer (SSL) connections. In contrast, the fourth connection with end-to-end encryption between the ID token and the first computer system is established on a higher layer, such as an application layer, using the third connection.

According to one embodiment of the invention, the TLS protocol version 1.0 or higher is used to protect the communication (The TLS Protocol, Version 1.0, http://www.ietf.org/rfc/rfc2246; The Transport Layer Security (TLS) Protocol, Version 1.1, http://www.ietf.org/rfc/rfc4346). The cryptographic algorithms and security parameters employed in the process preferably satisfy the requirements defined in the Technische Richtlinie Kryptographische Verfahren (Technical Guideline for Cryptographic Methods): Empfehlungen and Schlüssellängen (Recommendations and Key Lengths) (BSI-TR-02102), Version 1.0, 06/20/2008: https://www.bsi.bund.de/cae/servlet/contentblob/477256/publicationFile/43752/BSI-TR-02102_V1_0_pdf.pdf).

According to one embodiment of the invention, the second computer system generates a Security Assertion Markup Language (SAML) object, which contains the attribute specification and the signature of the second computer system. The SAML object is transmitted via the first connection to the third computer system and forwarded by the redirect from the third computer system to the first computer system via the second connection. The first computer system contains a SAML logic component, which is to say a computer program for receiving and processing SAML objects. In this embodiment, the second connection is established between the browser of the third computer system and the SAML logic component of the first computer system.

According to one embodiment of the invention, the first computer system comprises a protocol stack component, which is to say a computer program for carrying out a predetermined protocol stack, such as the protocol stack TR03112 specified by the German Federal Office for Information Security (BSI), for example. In such an embodiment, the third connection is established between the client of the third computer system and the protocol stack component of the first computer system.

According to one embodiment of the invention, the browser of the third computer system has a plug-in program. The plug-in program is used to forward the signed attribute specification, of the SAML object for example, via the second connection and to start the client and transfer the first certificate received via the first connection to the client. In this case, the client checks whether the identifiers of the certificates match.

According to one embodiment of the invention, the service certificate of the service computer system is an SSL certificate. The SSL certificate of the service computer system contains the identifier which uniquely identifies the service computer system. This identifier can be the public key of the service computer system, a hash value of this public key, or another unique identifier.

According to one embodiment of the invention, the identifier, which is used to uniquely identify the service computer system (and the authorization certificate), is indicated in form of a URL, which is composed of the Internet domain of the service provider and path name that describes the web application of the service provider which the user can access with the browser. The general format is as follows: https://<serviceproviderdomain>/<serviceproviderapplication>.

For example, https://new-xyz-webshop.de/shop is the identifier for the "shop" application of the service computer system https://new-xyz-webshop.de. Because of the stipulation to use domain names, uniqueness is established.

If the first cryptographically protected connection is an SSL connection, transmission of the service certificate of the service computer system, this being the second computer system, to the user computer system, this being the third computer system, is required to establish this first connection. This service certificate is identical to the first certificate received from the user computer system, unless a man-in-the-middle attack exists. The first certificate is stored by the user computer system.

An ID provider certificate may be asigned to the ID provider computer system, this being the first computer system. The ID provider certificate can likewise be an SSL certificate. The ID provider certificate contains an identifier of the ID provider computer system, such as the public key thereof, a hash value of the public key thereof, or another unique identifier, which identifies the ID provider computer system, this being the first computer system.

If the second cryptographically protected connection is a TLS connection, the transmission of the ID provider certificate from the ID provider computer system to the user computer system is required to establish this connection. The second certificate received by the user computer system is identical to the ID provider certificate if no man-in-the-middle attack exists.

The user computer system also stores the second certificate, which is to say the ID provider certificate under normal circumstances.

According to one embodiment of the invention, the authorization certificate of the ID provider computer system contains both the identifier of the service computer system and the identifier of the ID provider computer system. If no man-in-the-middle attack exists with regard to the establishment of the second cryptographically protected connection, the second certificate received by the user computer system is the ID provider certificate. The existence of man-in-the-middle attacks can therefore be excluded by the user computer system if the identifier of the first certificate is present in the authorization certificate and the identifier of the second certificate is likewise present in the authorization certificate.

In another concept, the invention relates to a computer program product, and more particularly to a digital storage medium, containing executable program instructions for carrying out a method according to the invention.

According to one embodiment of the invention, the ID token has a protected memory region for storing at least one attribute, means for authenticating the user associated with ID token with respect to the ID token, means for authenticating the first computer system with respect to the ID token, and means for establishing the fourth connection to the first computer system, via which the first computer system can read the at least one attribute, wherein a necessary prerequisite for the first computer system reading the at least one attribute from the ID token is the successful authentication of the user and of the first computer system with respect to the ID token.

In addition to the authentication of the first computer system with respect to the ID token, as is known, for example, as so-called Extended Access Control for machine-readable travel documents (MRTD) and specified by the International Civil Aviation Association (ICAO), the user must authenticate himself with respect to the ID token. The token is activated, for example, by a successful authentication of the user with respect to the ID token, so that the additional steps, these being the authentication of the first computer system with respect to the ID token and/or the establishment of a protected connection for reading the attributes, can be executed.

According to one embodiment of the invention, the ID token contains means for end-to-end encryption. This allows the fourth connection between the ID token and the first computer system to be established via the user's third computer system, because the user cannot carry out any modifications to the data transmitted via the connection because of the end-to-end encryption.

According to one embodiment of the invention, the first computer system comprises means for receiving an attribute specification via a network, wherein the attribute specification specifies at least one attribute, means for the authentication with respect to an ID token, means for reading at least one attribute from the ID token via a protected fourth connection, wherein the reading of the at least one attribute requires that a user associated with the ID token has authenticated himself with respect to the ID token.

According to one embodiment of the invention, the first computer system may comprise means for generating a request to the user. After the first computer system has received the attribute specification, for example from the second computer system, it then transmits a request to the user's third computer system, whereby the user is requested to authenticate himself with respect to the ID token. After the user has been successfully authenticated with respect to the ID token, the first computer system receives a confirmation from the third computer system. The first computer system thereafter authenticates itself with respect to the ID token, and the secure fourth connection is established between the ID token and the first computer system with end-to-end encryption.

According to one embodiment of the invention, the first computer system comprises several authorization certificates which each specify different read rights. After receipt of the attribute specification, the first computer system selects at least one of these authorization certificates having read rights that are sufficient for reading the specified attributes.

Embodiments of the first computer system according to the invention are particularly advantageous because they, combined with the necessity for the user to authenticate himself with respect to the ID token and the reliable defense against man-in-the-middle attacks, form a trust anchor for the user's genuine digital identity. To this end, it is particularly advantageous that this requires no prior registration by the user with respect to the computer system and no central storage of the user's attributes forming the digital identities.

According to one embodiment of the invention, the first computer system is a trust center certified by an authority, and more particularly a trust center compliant with the signature law.

According to embodiments of the invention, the different functional means of the computer systems are implemented by executable program instructions, a combination of hardware and software components, and/or electronic logic circuits.

Elements of the following embodiments that correspond to each other are denoted by the same reference numerals.

Figure 1B:
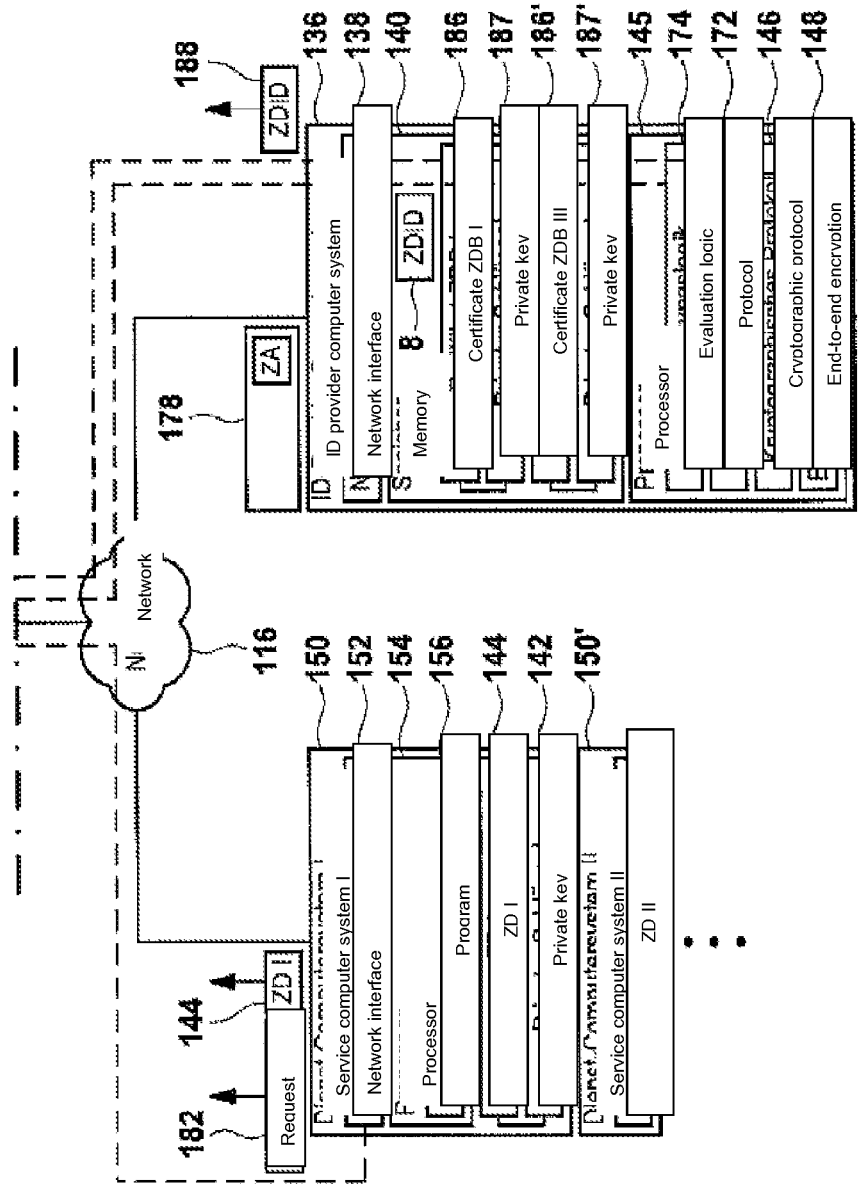

FIG. 1 shows a user computer system 100 of a user 102. The user computer program 100 can be a personal computer, a portable computer, such as a laptop or palmtop computer, a personal digital assistant, a mobile telecommunications device, notably a Smart Phone, or the like. The user computer system 100 has an interface 104 for communicating with an ID token 106, which comprises a corresponding interface 108. The interfaces 104 and 108 can, for example, be Near Field Communications (NFC), Bluetooth, RFID interfaces or the like.

The user computer system 100 comprises at least one processor 110 for executing program instructions 112 and 113 and a network interface 114 for communicating via a network 116. The network can be a computer network, for example the Internet.

A browser, such as Microsoft Internet Explorer or another conventional browser program, is implemented by way of the program instructions 112. The program instructions 112 can contain what is known as a plug-in for the browser.

A client is implemented by way of the program instructions 113. The corresponding server is formed by a protocol stack component 172 of the ID provider computer system 36.

The ID token 106 comprises an electronic memory 118 having protected memory regions 120, 122 and 124. The protected memory region 120 is used to store a reference value that is required for authenticating the user 102 with respect to the ID token 106. This reference value is, for example, an identifier, and more particularly a so-called Personal Identification Number (PIN), or reference data for a biometric feature of the user 102, which can be used to authenticate the user with respect to the ID token 106.

The protected region 122 is used to store a private key and the protected region 124 is used to store attributes, for example of the user 102, such as the name, place of residence, date of birth, or gender, and/or attributes relating to the ID token itself, such as the institute that created or issued the ID token, the validity period of the ID token, or an identifier of the ID token, for example a pass number or a credit card number.

The electronic memory 118 can further comprise a storage region for storing a certificate 126. The certificate 126 contains a public key that is associated with the private key stored in the protected memory region 122. The certificate can have been created according to a Public Key Infrastructure (PKI) standard, for example according to the X.509 standard.

The certificate 126 does not necessarily have to be stored in the electronic memory 118 of the ID token 106. As an alternative or in addition, the certificate 126 can also be stored on a public directory server.

The ID token 106 comprises a processor 128. The processor 128 is used to execute program instructions 130, 132 and 134. The program instructions 130 are used for the user authentication, which is to say to authenticate the user 102 with respect to the ID token.

In an embodiment using a PIN, the user 102 enters his pin in the ID token 106, for example via the user computer system 100, so as authenticate himself. By way of execution of the program instructions 130, the protected memory region 120 is accessed so as to compare the entered PIN to the reference value for the PIN stored there. If the entered PIN matches the PIN reference value, the user 102 is considered to be authenticated.

As an alternative, a biometric feature of the user 102 is detected. For example, the ID token 106 has a fingerprint sensor for this purpose, or a fingerprint sensor is connected to the user computer system 100. The biometric data detected from the user 102 is compared in this embodiment to the biometric reference data stored in the protected memory region 120 by execution of the program instructions 130. If the biometric data detected from the user 102 sufficiently matches the biometric reference data, the user 102 is considered authenticated.

The program instructions 134 are used to execute the steps of a cryptographic protocols relating to the ID token 106 for authenticating an ID provider computer system 136 with respect to the ID token 106. The cryptographic protocol can be a challenge-response protocol based on a symmetric key or an asymmetric key pair.

The cryptographic protocol implements, for example, an Extended Access Control method, as that which is specified for machine-readable travel documents (MRTD) by the International Civil Aviation Association (ICAO). By successfully executing the cryptographic protocol, the ID provider computer system 136 is authenticated with respect to the ID token and thus verifies the read authorization thereof for reading the attributes stored in the protected memory region 124. The authentication can also be mutual, which is to say the ID token 106 must then also authenticate itself with respect to the ID provider computer system 136 according to the same or another cryptographic protocol.

The program instructions 132 are used for the end-to-end encryption of data transmitted between the ID token 106 and the ID provider computer system 136, however at least of the attributes that are read from the protected memory region 124 by the ID provider computer system 136. A symmetric key can be used for the end-to-end encryption, which is agreed between the ID token 106 and the ID provider computer system 136, for example as part of the execution of the cryptographic protocol.

As an alternative to the embodiment shown in FIG. 1, the interface 104 of the user computer system 100 may not directly communicate with the interface 108, but via a reader for the ID token 106 that is connected to the interface 104. This reader, for example a so-called class-2 chip card terminal, can also be used to enter the PIN. The ID provider computer system 136 has a network interface 138 for communicating via the network 116.

The ID provider computer system 136 further has a memory 140, in which one or more authorization certificates and the associated private keys are stored. Each of the certificates is asigned to one of the service computer systems.

For example, different service computer systems, such as the service computer system I 150, the service computer system II 150' . . . , are connected. The service computer system I is identified by the certificate ZD I asigned to the operator of the service computer system I. Similarly, the service computer system II is identified by the certificate ZD II asigned to the operator of the service computer system II. The operators of these service computer systems have authorized the operator of the ID provider computer system 136 to perform the ID provider function for these service computer systems.

Similarly, the memory 140 of the ID provider computer system 136 stores the authorization certificate ZDB I 186 with the associated private key 187 as well as the authorization certificate ZDB II 186' and the associated private key 187', and optionally the authorization certificates and private keys for additional service computer systems. The memory 140 additionally stores an ID provider certificate ZDID 188.

Furthermore, the ID provider computer system 136 comprises at least one processor 145 for executing a program 146 and 148. By way of execution of the program instructions 146, the steps of the cryptographic protocol relating to the ID provider computer system 136 are carried out. In total, the cryptographic protocol is thus implemented by the execution of the program instructions 134 by the processor 128 of the ID token 106 and by the execution of the program instructions 146 by the processor 145 of the ID provider computer system 136.

The program instructions 148 are used to implement the end-to-end encryption on the part of the ID provider computer system 136, for example based on the symmetric key that was agreed between the ID token 106 and the ID provider computer system 136 as part of the execution of the cryptographic protocol. In general, any known method for agreeing on the symmetric key may be employed for the end-to-end-encryption, such as a Diffie-Hellman key exchange, for example.

The processor 145 additionally provides an evaluation logic 174 and a protocol stack component 172. The evaluation logic 174 can be a program module that forms a SAML logic component so as to receive and evaluate a SAML object. The protocol stack component 172 can be a program module for implementing a communications protocol, for example according to the Technical Directive of the German Federal Office for Information Security, BSI TR-03112-7. The memory 140 of the ID provider computer system 136 stores the various authorization certificates for those service computer systems which have authorized the ID provider computer system 136 to provide the ID provider function, which is to say here the authorization certificates ZDB I, ZDB II as well as the respective associated private keys 187 and 187'.

The ID provider computer system 136 is preferably located in a particularly protected environment, and more particularly in what is known as a trust center, so that the ID provider computer system 136, in combination with the need to authenticate the user 102 with respect to the ID token 106, forms the trust anchor for the authenticity of the attributes read from the ID token 106.

A service computer system 150 can be designed to accept an order or a request for a service or product, notably an online service. For example, the user 102 can open an account with a bank online via the network 116 or use another financial or banking service. The service computer system 150 can also be designed as an online warehouse, so that the user 102 can, for example, acquire a mobile telephone or the like online. The service computer system 150 can also be designed to deliver digital content, for example for downloading music and/or video data.

The service computer system 150 has a network interface 152 for communicating via the network 116 for this purpose. The service computer system 150 further comprises at least one processor 154 for executing program instructions 156. By way of execution of the program instructions 156, dynamic HTML pages are generated, for example, via which the user 102 can enter the request or order.

Depending on the type of the requested or ordered product or service, the service computer system 150 must check one or more attributes of the user 102 and/or of the ID token 106 based on one or more predetermined criteria. The request or order of the user 102 is only accepted and/or executed when this review has been successfully passed.

For example, opening a bank account or purchasing a mobile telephone, together with the associated contract, requires the user 102 to disclose his identity with respect to the service computer system 150 and for this identity to be checked. In the prior art, the user 102 had to present his identification card, for example, for this purpose. This process has been replaced by the reading of the digital identity of the user 102 from the ID token 106.

Depending on the application, however, the user 102 does not have to disclose his identity with respect to the service computer system 150, but it is sufficient to communicate only one of the attributes, for example. The user 102 can, for example, furnish proof by way of one of the attributes that he belongs to a specific group of people authorized to access data that is kept available on the service computer system 150 for downloading. Such a criterion can, for example, be a minimum age of the user 102 or that the user 102 belongs to a group of people with the authorization to access specific confidential data.

The computer systems according to FIG. 1 are preferably designed so that the service certificate 144 contains an identifier of the service computer system in question. The service computer system I is identified by the identifier of the certificate ZDI, for example.

Similarly, the ID provider certificate ZDID 188 contains an identifier which uniquely identifies the ID provider computer system 136. The authorization certificate 186 asigned to the service computer system I thus contains the identifier of the service computer system I and the identifier of the ID provider computer system.

So as to utilize the service provided by the service computer system 150, the following procedure is employed:

The user 102 starts the execution of the program instructions 112, for example a conventional web browser program, such as Microsoft Internet Explorer. The user 102 selects one of the service computer systems via the network 116, which is to say the Internet, for example. Without limiting the general nature of the invention, it shall be assumed hereafter that the user 102 selects the service computer system I. On the website of the service computer system I, the user 102 selects a specific service offered by the service computer system I. Then, a first cryptographically protected connection TLS1 is established between the service computer system I and the browser 112. The Transport Layer Security (TLS) protocol can be used for this purpose. For the establishment of the first cryptographically protected connection TLS1, the service computer system I transmits the certificate ZD I 144 thereof to the user computer system 100 as part of the execution of the TLS protocol. The authorization certificate ZDB I 186 contains, for example, a reference to the certificate ZD I 144, which can be designed in particular as a TLS certificate. The user computer system 100 thus receives a first certificate Z 176. This certificate Z 176 is generally the certificate ZD I 144 of the service computer system I. In the case of a so-called man-in-the-middle attack by an attacker 178, however, the certificate ZD I 144 can be exchanged by the attacker 178 with the certificate ZA 180 of the same, so that the user computer system 100 then stores the certificate ZA 180 as the certificate Z 176.

After the connection TLS1 has been established, the service computer system I transmits an attribute specification 182 to the browser 112 of the user computer system 100 via TLS1. The attribute specification 182 contains a specification of those attributes of the ID token 106 of which the service computer system I has to have knowledge so as to be able to provide the service desired by the user 102. This attribute specification 182 is a request of the service computer system I to the ID provider computer system 136 for the secure reading of these attributes. The attribute specification 182 is signed by the service computer system I using the private key 142. The signature also includes the certificate ZD I. The attacker 178 can attempt to manipulate the signature of the request 182 by exchanging the certificate ZD I with the certificate ZA. The attribute specification 182 also contains the identifier of the service computer system I.

The attribute specification 182 can take on the form of a so-called SAML object. In response to receipt of the SAML object 182, a plug-in program of the browser 112 is accessed. Thereafter, a second cryptographically protected connection TLS2 is established between the browser 112 and the evaluation logic 174 of the ID provider computer system 136 via the network 116, for example likewise according to the TLS protocol. For this purpose, the ID provider certificate ZDID 188 is transmitted to the user computer system 100, where it is received as the second certificate 190, which is identical to ZDID 188, unless it has been replaced by the certificate ZA of an attacker 180 as a result of a man-in-the-middle attack. The user computer system 100 stores the certificate 190. In addition, the program instructions 113 (client) are started.

The signed request 182 is forwarded via a so-called redirect from the browser 112 via the connection TLS2 to the evaluation logic 174. The ID provider computer system 136 evaluates the request 182 with the aid of the evaluation logic 174. The ID provider computer system 136 thus identifies the service computer system from which the request 182 was sent, this being the service computer system I in the present example. This can be done using the signature of the request 182 or using another identifier of the service computer system I that is contained in the request 182. For the ID provider computer system 136 to be able to provide the requested ID provider function, an authorization certificate, together with the associated private key, which matches the detected identity of the requesting service computer system, this being the service computer system I in the present example, must be available in the memory 140. If such an authorization certificate cannot be found, the process is terminated at this point.

After the service computer system 1 has been successfully identified, the evaluation logic 174 thus selects the certificate ZDB I from the memory 140 for the further procedure. A man-in-the-middle attack may also take place when the request 182 is transmitted via TLS2, again for example by the attacker 178, who can attempt to manipulate the signature of the request 182 using his certificate ZA.

In this case, a third cryptographically protected connection TLS3, again according to the TLS protocol, for example, is established between the protocol stack component 172 and the client 113. As part of the establishment of the third connection TLS3, the ID provider computer system 136 transmits the authorization certificate of the identified service computer system, which in this example is the certificate ZDB I 186 of the identified service computer system I, to the client 113. The client 113 then checks whether the authorization certificate received via the connection TLS3, which here is the certificate ZDB I, matches the stored certificates 176 and 190. The ID provider certificate can be used to establish the protected connection TLS3 so as to then transmit the authorization certificate of the identified service computer system via TLS3, or the authorization certificate of the identified service computer system can be used to establish the protected connection TLS3, so that the authorization certificate is transmitted in this way To this end, it is checked whether the certificates 176 and 190 contain the identifiers of the received authorization certificate. If this is not the case, this indicates the existence of a man-in-the-middle attack and the further procedure is terminated. In contrast, if a match exists, the process can continue.

Authentication of the user 102 with respect to the ID token 106. The user 102 authenticates himself with respect to the ID token 106. In the case of an implementation using a PIN, the user 102 enters the PIN, for example via the user computer system 100 or a chip card terminal connected thereto. By way of execution of the program instructions 130, the ID token 106 then checks the accuracy of the entered PIN. If the entered PIN matches the reference value of the PIN that is stored in the protected memory region 120, the user 102 is considered to be authenticated. A similar procedure can be employed when a biometric feature of the user 102 is used so as to authenticate the same, as described above.

Authentication of the ID provider computer system 136 with respect to the ID token 106.

For this purpose, a fourth connection 184 is established between the ID token 106 and the ID provider computer system 136 via the user computer system 100 and the network 116. The fourth connection 184 is established on a higher layer of the OSI layer model than the connection TLS3. The transport layer that is used for the fourth connection is the third connection TLS3 and the communication between the interfaces 108 and 104. The authorization certificate of the service computer system identified by the ID provider computer system 136, this being ZDB I in the present example, is transmitted to the ID token 106 via the fourth connection 84. Via the program instructions 134, a so-called challenge is then generated, which is to say a random number, for example. This random number is encrypted with the public key of the ID provider computer system 136 that is contained in the certificate 144. The resulting ciphertext is transmitted from the ID token 106 via the connection 184 to the ID provider computer system 136. The ID provider computer 136 decrypts the ciphertext using the private key 142 of the system and thus obtains the random number. The ID provider computer system 136 transmits the random number back to the ID token 106 via the connection 184. By way of execution of the program instructions 134, it is checked there whether the random number received from the ID provider computer system 136 matches the originally generated random number, which is to say the challenge. If this is the case, the ID provider computer system 136 is considered to be authenticated with respect to the ID token 106. The random number can be used as a symmetric key for the end-to-end encryption.

After the user 102 has successfully authenticated himself with respect to the ID token 106, and after the ID provider computer system 136 has successfully authenticated itself with respect to the ID token 106, the ID provider computer system 136 receives a read authorization for reading one, more or all attributes stored in the protected memory region 124. Based on a corresponding read command, which the ID provider computer system 136 transmits via the connection to the ID token 106, the requested attributes are read from the protected memory region 124 and encrypted by way of the execution of the program instructions 132. The encrypted attributes are transmitted to the ID provider computer system 136 via the connection, where they are decrypted by way of the execution of the program instructions 148. The ID provider computer system 136 thus gains knowledge of the attributes read from the ID token 106.

The ID provider computer system signs these attributes using the authorization certificate ZDB I 186 on behalf of the service computer system I 150, and the attributes are transmitted either via the user computer system 100 or directly to the service computer system 150. The service computer system 150 is thus informed about the attributes read from the ID token 106, so that the service computer system 150 can check these attributes based on the predetermined one or more criteria so as to then optionally provide the service requested by the user 102.

Because of the need of the authentication of the user 102 with respect to the ID token 106 and of the authentication of the ID provider computer system 136 with respect to the ID token 106, the required trust anchor is created, so that the service computer system 150 can be certain that the attributes of the user 102 communicated by the ID provider computer system 136 are accurate and not forged.

Depending on the embodiment, the sequence of the authentication may be different. It is possible, for example, for the user 102 to first have to authenticate himself with respect to the ID token 106 and thereafter the ID provider computer system 136. However, in general it is also possible for the ID provider computer system 136 to first have to authenticate itself with respect to the ID token 106 and only then for the user 102 to have to do so.

In the first case, the ID token 106 is, for example, designed so that it is activated only when a correct PIN or a correct biometric feature is input by the user 102. Only this activation allows the program instructions 132 and 134 to start, and thus the authentication of the ID provider computer system 136.

In the second case, the program instructions 132 and 134 can already start even if the user 102 has not authenticated himself with respect to the ID token 106. In this case, the program instructions 134, for example, are designed so that the ID provider computer system 136 can issue a read access to the protected memory region 124 for reading one or more of the attributes only after the program instructions 130 have signaled the successful authentication of the user 102 as well.

The protection against man-in-the-middle attacks is additionally particularly advantageous, in particular due to the check by the client 113 as to whether the certificate 176 or 190 matches the authorization certificate received subsequently as part of the establishment of the third connection TLS3. This allows for an effective defense against the various possible man-in-the-middle attacks, for example by the attacker 178.

It is particularly advantageous to be able to utilize the ID token 106 for e-commerce and e-government applications, for example, and more specifically without media breaches and with legal certainty, because of the trust anchor created by the need for the user 102 to authenticate himself and the need for the ID provider computer system 136 to authenticate itself with respect to the ID token 106. It is also particularly advantageous that no central storage of the attributes of different users 102 is required, whereby the data protection problems that exist in the prior art are hereby solved. As far as the convenience of the use of the method is concerned, it is particularly advantageous that no prior registration of the user 102 is required to be able to utilize the ID provider computer system 136.

Figure 2:
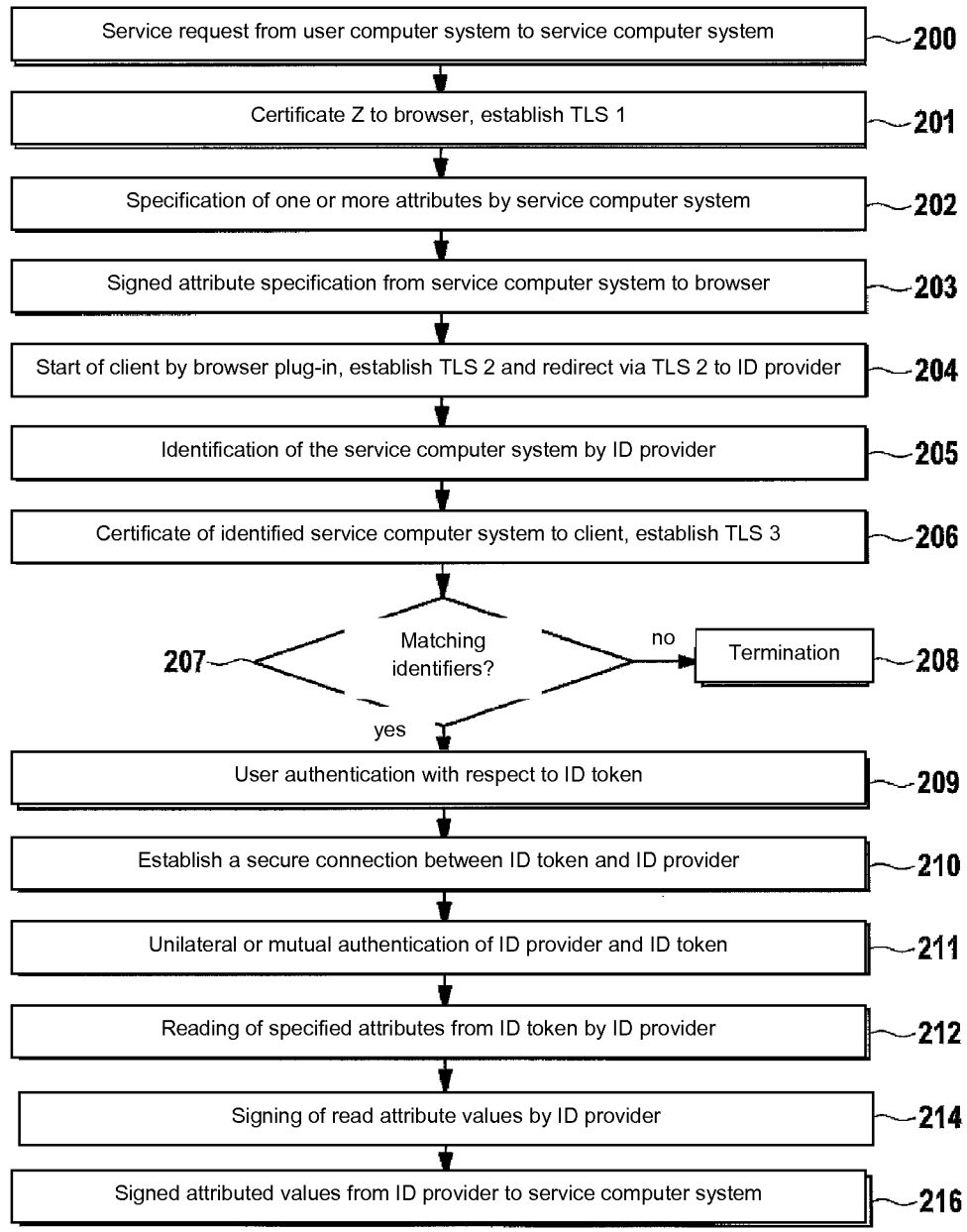
FIG. 2 shows a flowchart of onen embodiment of a method according to the invention.

FIG. 2 shows an embodiment of a method according to the invention. In step 200, a service request is transmitted from the user computer system to the service computer system. For this purpose, the user opens, for example, an Internet browser of the user computer system and enters a URL to access a website of the service computer system. The user then enters his service request on the accessed website, for example so as to commission or place an order for a service or a product.

In step 201, the first connection TLS1 is established. For this purpose, the certificate of the service computer system is communicated to the user computer system. The user computer system thus gains knowledge of the certificate of the service computer system, which however may have been replaced with an attacker certificate ZA by an attacked due to man-in-the-middle attack. The certificate of the service computer system or that of the attacker is then stored by the user computer system.

In step 202, the service computer system 150 then specifies one or more attributes which it requires in order to check the authorization of the user to request the service. The service computer system can specify in particular such attributes which define the digital identity of the user 102. This specification of the attributes by the service computer system 150 can be permanently predetermined, or it can be determined by the service computer system 150 based on predetermined rules, depending on the service request in the individual case. This attribute specification is signed by the service computer system.

In step 203, the signed attribute specification, which is to say the specification of the one or more attributes that was made in step 202, is transmitted from the service computer system to the ID provider computer system, and more specifically via the connection TLS1, and received by the browser of the system.

The client of the user computer system is then started by way of a plug-in program of the browser. In addition, the second connection TLS2 between the browser and the evaluation logic of the ID provider computer system is established, and the signed request is forwarded by a so-called redirect of the browser via the second connection TLS2 to the ID provider computer system, which is to say the evaluation logic thereof. So as to establish the second connection TLS2, the ID provider certificate is transmitted to the user computer system and the second certificate received thereupon from the user computer system is stored. In step 205, the ID provider computer system identifies the service computer system from which the signed request originated. This can be done in that the ID provider computer system checks the validity of the signature of the request and, if the signature is valid, that the certificate of the signature is used to identify the service computer system. In step 206, the third connection TLS3 is then established between the protocol stack component and the client. The authorization certificate of the service computer system, which optionally may have been identified by the ID provider computer system, is transmitted to the client for this purpose.

In step 207, the client of the user computer system 100 checks whether the identifiers of the stored first and second certificates match the authorization certificate of the identified service computer system that was received during the establishment of the third connection TLS3. If this is not the case, the process is terminated in step 208 because a man-in-the-middle attack exists. In the other case, the user authenticates himself in step 209 with respect to the ID token so as to give the ID provider computer system the option to read attributes from the ID token.

In step 210, the fourth connection between the ID token and the ID provider computer system is established. This is a secure connection, for example according to what is known as a Secure Messaging method.

In step 211, at least one authentication of the ID provider computer system with respect to the ID token via the connection established in step 208 takes place. In addition, an authentication of the ID token with respect to the ID provider computer system may be provided for.

After both the user and the ID provider computer system have been successfully authenticated with respect to the ID token, the ID provider computer system receives the access authorization for reading the attributes from the ID token. In step 212, the ID provider computer system transmits one or more read commands for reading the attributes that are required according to the attribute specification from the ID token. The attributes are then transmitted to the ID provider computer system via the secure connection using end-to-end encryption, where they are decrypted.

The read-out attribute values are signed by the ID provider computer system in step 214. In step 216, the ID provider computer system transmits the signed attribute values via the network. The signed attribute values reach the service computer system either directly or via the user computer system. In the latter case, the user can have the option to acknowledge the signed attribute values and/or supplement them with additional data. According to the invention, the signed attribute values, optionally together with the supplemented data, may be forwarded from the user computer system to the service computer system only after the release has been given by the user. This establishes the greatest possible transparency for the user with regard to the attributes transmitted from the ID provider computer system to the service computer system.

FIG. 3 shows another embodiment of a method according to the invention. When a user inputs a user 102 in a user computer system 100, which is to say the browser 112, for example, the user 102 specifies a service of a service computer system which he or she would like to utilize. This is done, for example, by accessing an Internet page of the service computer system and selecting one of the services offered there. The service request of the user 102 is transmitted from the user computer system 100 to the service computer system 150.

The service computer system 150 responds to the service request with a signed attribute specification, which is to say a list of attribute names, for example, in form of a SAML object, which is transmitted via TLS1 to the browser 112. The browser 112 receives a certificate 176, which is stored temporarily, as part of the establishment of TLS1. After receipt of the attribute specification, for example, the user computer system 100 asks the user 102, for example via a prompt, to authenticate himself with respect to the ID token 106. This request can be made by a plug-in of the browser 112 or by a client 113 of the user computer system 100.

The user 102 thereupon authenticates himself with respect to the ID token 106, for example by entering his PIN. After successful authentication, the signed attribute specification is forwarded from the user computer system 100 to an ID provider computer system 136 using a so-called redirect of the browser 112, and more specifically via TLS2.

The ID provider computer system 136 identifies the service computer system 150 based on the signed attribute specification and then establishes the connection TLS3 to the client 113 of the user computer system, for example using a BSI TR-03112-compliant protocol. The authentication certificate of the identified service computer system 150 is transmitted to the client 113 during this process. The client 113 further receives the certificate 176, which was received as part of the establishment of TLS1, from the browser 112 and compares the two certificates to each other. If the identifiers of the two certificates match, the process continues by authenticating the ID provider computer system via the third connection and the interfaces of the user computer system and the ID token (see interfaces 104 and 108 in the embodiment of FIG. 1), whereupon the fourth connection with end-to-end encryption is established. The ID provider computer system 136 then addresses a read request for reading the attributes in accordance with the attribute specification to the ID token 106 via the fourth connection.

Provided that the previous authentications of the user 102 and of the ID provider computer system 136 were successful, the ID token 106 responds to the read request with the desired attributes. The ID provider computer system 136 signs the attributes and transmits the signed attributes to the user computer system 100. After the release has been given by the user 102, the signed attributes are transmitted to the service computer system 150, which can optionally provide the desired service.

LIST OF REFERENCE NUMERALS

100 User computer system
102 User
104 Interface
106 ID token
108 Interface
110 Processor
112 Program instructions (browser)
113 Program instructions (client)
114 Network interface
116 Network
118 Electronic memory
120 Protected memory region
122 Protected memory region
124 Protected memory region
126 Certificate
128 Processor
130 Program instructions
132 Program instructions
134 Program instructions 136 ID provider computer system
138 Network interface
140 Memory
142 Private key
142' Private key
144 Certificate
144' Certificate
145 Processor
146 Program instructions
148 Program instructions
149 Program instructions
150 Service computer system
152 Network interface
154 Processor
156 Program instructions
158 Configuration data record
160 Configuration data record
161 Configuration data record
162 User input
164 Service request
166 Attribute specification
168 Request
170 Response
172 Protocol stack component
174 Evaluation logic
176 First certificate
178 Attacker
180 Certificate ZA
182 Attribute specification (SAML object)
184 Connection
186 Authorization certificate
187 Private key
188 ID provider certificate
190 Second certificate

What is claimed is:

1. A method for reading at least one attribute stored in an ID token using first, second and third computer systems, the third computer system comprising a browser and a client, and a service certificate being assigned to the second computer system, the service certificate containing an identifier which identifies the second computer system, the ID token being assigned to a user, comprising:
    establishing a first cryptographically protected connection between the browser of the third computer system and the second computer system, wherein the third computer system receives a first certificate;
    the third computer system storing the first certificate;
    the third computer system receiving a signed attribute specification via the first connection;
    establishing a second cryptographically protected connection between the browser of the third computer system and the first computer system, wherein the third computer system receives a second certificate;
    the third computer system forwarding the signed attribute specification via the second connection to the first computer system;
    the first computer system accessing an authorization certificate, wherein the authorization certificate contains the identifier;
    establishing a third cryptographically protected connection between the first computer system and the client of the third computer system, wherein the third computer system receives the authorization certificate containing the identifier via the third connection;
    the client checking the third computer system as to whether the identifier is present in the first certificate as proof that the first certificate matches the service certificate;
    the user authenticating himself with respect to the ID token;
    the first computer system authenticating itself with respect to the ID token;
    establishing a fourth cryptographically protected connection between the ID token and the first computer system with end-to-end encryption;
    after successful authentication of the user and of the first computer system with respect to the ID token, the first computer system receiving read access to the at least one attribute stored in the ID token via the fourth connection so as to read the one or more attributes specified in the attribute specification from the ID token;
    the first computer system transmitting the at least one attribute to the third computer system after the attribute has been signed;
    and the third computer system transmitting the at least one signed attribute to the second computer system,
    where the at least one signed attribute is transmitted to the second computer system without use of any direct connection between the first computer and the second computer.

2. The method according to claim 1, wherein the first computer system is authenticated with respect to the ID token using the authorization certificate, the authorization certificate containing information about those attributes stored in the ID token for which the first computer system has read access authorization.

3. The method according to claim 2, wherein the ID token checks the read authorization of the first computer system for the read access to at least one of the attributes using the authorization certificate.

4. The method according to claim 1, wherein the first, second and third connections are transport layer connections, respectively, and the fourth connection is established via the third connection.

5. The method according to claim 1, wherein the first computer system contains a protocol stack component, to which the third connection is established.

6. A method according to claim 1, wherein an ID provider certificate which contains an identifier of the first computer system is assigned to the first computer system, wherein the ID provider certificate is used to establish the second cryptographically protected connection, and the second certificate received thereupon from the first computer system is stored, and wherein the authorization certificate contains both the identifier of the first computer system and the identifier of the second computer system, wherein the client of the third computer system checks whether an identifier of the first certificate and an identifier of the second certificate are present in the authorization certificate, and wherein the fourth cryptographically protected connection is only established if the identifier of the first certificate and the identifier of the second certificate are present in the authorization certificate.

7. A method according to claim 1, comprising identifying the authorization certificate based on the attribute specification.

8. A non-transitory computer readable medium containing computer instructions that, when executed by one or more processors of a computer system, perform a method for reading at least one attribute stored in an ID token using first, second and third computer systems, the third computer system comprising a browser and a client, and a service certificate being assigned to the second computer system, the service certificate containing an identifier which identifies the second computer system, the ID token being assigned to a user, the method comprising:

establishing a first cryptographically protected connection between the browser of the third computer system and the second computer system, wherein the third computer system receives a first certificate;

the third computer system storing the first certificate;

the third computer system receiving a signed attribute specification via the first connection;

establishing a second cryptographically protected connection between the browser of the third computer system and the first computer system, wherein the third computer system receives a second certificate;

the third computer system forwarding the signed attribute specification via the second connection to the first computer system;

the first computer system accessing an authorization certificate, wherein the authorization certificate contains the identifier;

establishing a third cryptographically protected connection between the first computer system and the client of the third computer system, wherein the third computer system receives the authorization certificate containing the identifier via the third connection;

the client checking the third computer system as to whether the identifier is present in the first certificate as proof that the first certificate matches the service certificate;

the user authenticating himself with respect to the ID token;

the first computer system authenticating itself with respect to the ID token;

establishing a fourth cryptographically protected connection between the ID token and the first computer system with end-to-end encryption;

after successful authentication of the user and of the first computer system with respect to the ID token, the first computer system receiving read access to the at least one attribute stored in the ID token via the fourth connection so as to read the one or more attributes specified in the attribute specification from the ID token;

the first computer system transmitting the at least one attribute to the third computer system after the attribute has been signed;

and the third computer system transmitting the at least one signed attribute to the second computer system, where the at least one signed attribute is transmitted to the second computer system without use of any direct connection between the first computer and the second computer.

9. A computer system, comprising: a browser and a client;

a first communications interface configured to establish a first cryptographically protected connection between the browser and a second computer system for receiving a first certificate and a signed attribute specification, wherein the first certificate contains an identifier;

a memory configured to store the first certificate;

a second communications interface configured to establish a second cryptographically protected connection between the browser and a first computer system using a second certificate, wherein the second certificate contains a further identifier;

a forwarding module configured to forward the signed attribute specification, which was received via the first connection, via the second connection;

a third communications interface configured to establish a third cryptographically protected connection between the client and the first computer system, wherein an authorization certificate is received, the authorization certificate containing the identifiers of the first and second computer systems;

an identification module configured to check whether the identifiers of the authorization certificate match the identifiers of the first and second certificates; and a fourth communications interface configured to establish a fourth cryptographically protected connection between an ID token and the first computer system with end-to-end encryption so as to give the first computer system read access to the at least one attribute stored in the ID token via the fourth connection after the user and the first computer system have been successfully authenticated with respect to the ID token, wherein the forwarding module is further configured to receive, the first computer system, the at least one attribute read by the first computer system after it has been signed by the first computer system; and forward the signed at least one attribute to the second computer system, without use of any direct communication between the first computer system and the second computer system.

10. The computer system according to claim 9, wherein the identification module is designed to carry out a redirect.

11. The computer system according to claim 9, wherein the browser comprises a plug-in program operable to start the client after the browser has received the signed attribute specification and via which the first certificate is transferred to the client.

12. An ID token comprising:

a memory operable to store:

at least one of: a personal identification number (PIN) of a user associated with the ID token, and reference biometric data of the user; and one or more attributes;

an interface to a third computer system, operable to establish, a first cryptographically protected connection to a first computer system and a second cryptographically protected connection to a second computer system, where the first and second cryptographically protected connections are established via the third computer system;

a processor, operatively coupled to the interface and the memory, the processor operable to execute:

a user authentication module configured to authenticate a user using at least one of the personal identification number (PIN) and the reference biometric data;

an end-to-end encryption module configured to establish a first cryptographically protected connection to a first computer system and a second cryptographically protected connection to a second computer system, where the first and second cryptographically protected connections are established via a third computer system; and cryptographic protocol module configured to authenticate the first computer system with respect to the ID token;

wherein, after an attribute specification, generated and signed by the second computer, is transmitted to the first computer and authenticated by the first computer, and responsive to a read request from the first computer system, the at least one attribute is read from the memory;

wherein the end-to-end encryption module is further configured to:

encrypt the at least one attribute read from memory; and after the ID token has authenticated both the user and the first computer system, transmit the at least one attribute, via the first connection, to the first computer system, wherein the third computer system comprises a browser and a client, and a service certificate is assigned to the second computer system, the service certificate containing an identifier which identifies the second computer system, and wherein the processor of the ID token, in cooperation with the first second and third computers, is configured to perform a method comprising:

establishing the first cryptographically protected connection between the browser of the third computer system and the second computer system, wherein the third computer system receives a first certificate;

the third computer system storing the first certificate;

the third computer system receiving the signed attribute specification via the first connection;

establishing the second cryptographically protected connection between the browser of the third computer system and the first computer system, wherein the third computer system receives a second certificate;

the third computer system forwarding the signed attribute specification via the second connection to the first computer system;

the first computer system accessing an authorization certificate, wherein the authorization certificate contains the identifier;

establishing a third cryptographically protected connection between the first computer system and the client of the third computer system, wherein the third computer system receives the authorization certificate containing the identifier via the third connection;

the client checking the third computer system as to whether the identifier is present in the first certificate as proof that the first certificate matches the service certificate;

the user authenticating himself with respect to the ID token;

the first computer system authenticating itself with respect to the ID token;

establishing a fourth cryptographically protected connection between the ID token and the first computer system with end-to-end encryption;

after successful authentication of the user and of the first computer system with respect to the ID token, the first computer system receiving read access to the one or more attributes stored in the ID token via the fourth connection so as to read the one or more attributes specified in the attribute specification from the ID token;

the first computer system transmitting the one or more attributes to the third computer system after the one or more attributes have been signed;

and the third computer system transmitting the one or more signed attributes to the second computer system, where the one or more signed attribute are transmitted to the second computer system without use of any direct connection between the first computer and the second computer.

13. The ID token of claim 12, wherein the ID token comprises a plastic-based or paper-based electronic document.

14. The ID token of claim 12, wherein the interface to the third computer system comprises a Universal Serial Bus (USB) interface.

15. The ID token of claim 12, wherein the ID token comprises a chip-card and wherein the interface to the third computer comprises an interface to a chip-card reader.

16. The ID token of claim 12, wherein the end-to-end encryption module establishes the first cryptographically protected connection to the first computer system via a client of the third computer system and wherein the first cryptographically protected connection includes an Internet link.

17. The ID token of claim 12, wherein the end-to-end encryption module establishes the second cryptographically protected connection to the second computer system via a browser of the third computer system and wherein the second cryptographically protected connection includes an Internet link.

18. The ID token of claim 12, wherein the memory is further operable to store:

a certificate of the ID token; and a private encryption key of the ID token, and wherein the cryptographic protocol module further configured to authenticate the ID token with respect to the first computer system.

* * * * *